(12) United States Patent
Tin et al.

(10) Patent No.: US 10,599,851 B2
(45) Date of Patent: Mar. 24, 2020

(54) MALICIOUS CODE ANALYSIS METHOD AND SYSTEM, DATA PROCESSING APPARATUS, AND ELECTRONIC APPARATUS

(71) Applicant: Wistron Corporation, New Taipei (TW)

(72) Inventors: Hsiao-Wen Tin, New Taipei (TW); Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 188 days.

(21) Appl. No.: 14/994,141

(22) Filed: Jan. 13, 2016

(65) Prior Publication Data
US 2017/0091461 A1 Mar. 30, 2017

(30) Foreign Application Priority Data
Sep. 25, 2015 (TW) .............................. 104131747 A (51) Int. Cl.
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |

(Continued)

(52) U.S. Cl.
CPC ............ *G06F 21/577* (2013.01); *G06F 21/53* (2013.01); *G06F 21/564* (2013.01); *G06F 21/566* (2013.01)

(58) Field of Classification Search
USPC .................................................... 726/22–25
See application file for complete search history.

(56) References Cited

U.S. PATENT DOCUMENTS

| 8,190,647 B1 | 5/2012 | Pereira et al. |
| 9,203,804 B2 | 12/2015 | Chen et al. |

(Continued)

FOREIGN PATENT DOCUMENTS

| CN | 102982284 | 3/2013 |
| CN | 103761481 | 4/2014 |
| CN | 104580133 | 4/2015 |

OTHER PUBLICATIONS

"Office Action of Taiwan Counterpart Application," dated Mar. 16, 2016, with English translation thereof, p. 1-p. 13, in which the listed references were cited.

(Continued)

*Primary Examiner* — Wasika Nipa
*Assistant Examiner* — Samuel Ambaye
(74) *Attorney, Agent, or Firm* — JCIPRNET (57) ABSTRACT

A malicious code analysis method and system, a data processing apparatus, and an electronic apparatus are provided. A behavior characteristic data corresponding to a suspicious file is received from the electronic apparatus via the data processing apparatus to analyze the behavior characteristic data. The behavior characteristic data corresponding to the suspicious file is compared with a malware characteristic data of each of a plurality of malicious codes to obtain a comparison result. And based on the comparison result, a representative attack code corresponding to the suspicious file is obtained and a precaution corresponding to the representative attack code is transmitted to the electronic apparatus.

19 Claims, 3 Drawing Sheets

(51) Int. Cl.
    *G06F 21/56*    (2013.01)
    *G06F 21/53*    (2013.01)

(56)            References Cited

U.S. PATENT DOCUMENTS

| | | | |
|---|---|---|---|
| 2011/0219449 A1* | 9/2011 | St. Neitzel | G06F 11/00 726/23 |
| 2012/0233656 A1* | 9/2012 | Rieschick | H04L 63/1441 726/1 |
| 2013/0067579 A1* | 3/2013 | Beveridge | G06F 21/56 726/24 |
| 2015/0096022 A1* | 4/2015 | Vincent | G06F 21/566 726/23 |
| 2015/0096027 A1* | 4/2015 | Romanenko | G06F 21/56 726/23 |
| 2015/0121450 A1 | 4/2015 | Chen et al. | |
| 2015/0205962 A1* | 7/2015 | Swidowski | G06F 21/566 726/23 |

OTHER PUBLICATIONS

"Office Action of China Counterpart Application", dated Nov. 2, 2018, p. 1-p. 14.

\* cited by examiner

MALICIOUS CODE ANALYSIS METHOD
AND SYSTEM, DATA PROCESSING
APPARATUS, AND ELECTRONIC
APPARATUS

CROSS-REFERENCE TO RELATED
APPLICATION

This application claims the priority benefit of Taiwan application serial no. 104131747, filed on Sep. 25, 2015. The entirety of the above-mentioned patent application is hereby incorporated by reference herein and made a part of this specification.

BACKGROUND OF THE INVENTION

Field of the Invention

The invention relates to a data security mechanism, and particularly a malicious code analysis method and system, a data processing apparatus, and an electronic apparatus.

Description of Related Art

With the advancement and innovation of technology, the Internet not only promotes worldwide information exchange, but the lifestyle of more and more people is shifting from the real world to the virtual world. However, quite a few ill-intended people carry out malicious attacks through the Internet, and computer viruses are one of the malicious programs that cause programs to self-reduplicate, infect other normal programs in a computer, or damage a computer system and accordingly stop the computer from functioning normally.

"The computer virus immune system" originates from the biological immune technology. The application of an anti-virus system is conceptualized as injection of a type of virus vaccine. The injection enables a computer to generate natural resistance against this virus. However, existing anti-virus software cannot formulate a method for removing a virus until the virus occurs and cannot take protective measures against unknown viruses.

SUMMARY OF THE INVENTION

The invention provides a malicious code analysis method and system and a data processing apparatus. Even if a malicious code is unknown, a corresponding precaution is obtained through learning.

The malicious code analysis method of the invention includes: receiving a behavior characteristic data corresponding to a suspicious file from an electronic apparatus via the data processing apparatus. The data processing apparatus executes the following steps: comparing the behavior characteristic data corresponding to the suspicious file with a malware characteristic data of each of a plurality of malicious codes to obtain a comparison result; based on the comparison result, obtaining a representative attack code corresponding to the suspicious file, wherein the representative attack code includes one or more of the malicious codes; and transmitting a precaution of the representative attack code to the electronic apparatus.

In one embodiment of the invention, before the behavior characteristic data corresponding to the suspicious file is received from the electronic apparatus via the data processing apparatus, the electronic apparatus executes the following steps: monitoring whether the suspicious file exists in the electronic apparatus; when the suspicious file is detected, constructing a sandbox simulation region to monitor the suspicious file in the sandbox simulation region; identifying whether the suspicious file matches a known malicious code type recorded in the electronic apparatus; if the known malicious code type corresponding to the suspicious file is identified, converting the suspicious file into a typical attack code corresponding to the known malicious code type and applying a precaution of the typical attack code to the sandbox simulation region; and if the known malicious code type corresponding to the suspicious file is unidentifiable, transmitting the behavior characteristic data corresponding to the suspicious file to the data processing apparatus.

In one embodiment of the invention, the malicious code analysis method further includes: after the precaution of the representative attack code is received by the electronic apparatus, converting the suspicious file into a typical attack code corresponding to the representative attack code and applying the precaution to the sandbox simulation region.

In one embodiment of the invention, after the representative attack code corresponding to the suspicious file is obtained, the malicious code analysis method further includes: storing the precaution of the representative attack code to a filter database of the data processing apparatus; and after a designated period of time, reading the precaution from the filter database and transmitting the precaution to the electronic apparatus.

In one embodiment of the invention, in the step of comparing the behavior characteristic data corresponding to the suspicious file with the malware characteristic data of each of the malicious codes to obtain the comparison result, a similarity probability between the suspicious file and each of the malicious codes is calculated by using an information entropy theory, wherein the similarity probability is a degree of similarity between the suspicious file and each of the malicious codes. In the step of obtaining the representative attack code corresponding to the suspicious file based on the comparison result, the similarity probability corresponding to each of the malicious codes is compared with a threshold value to retrieve one or more of the malicious codes corresponding to the similarity probability higher than the threshold value to serve as the representative attack code.

In one embodiment of the invention, in the step of comparing the behavior characteristic data corresponding to the suspicious file with the malware characteristic data of each of the malicious codes to obtain the comparison result, a similarity probability and a probability of minimum difference between the suspicious file and each of the malicious codes are calculated by using an information entropy theory, wherein the similarity probability is a degree of similarity between the suspicious file and each of the malicious codes and the probability of minimum difference is a degree of dissimilarity between the suspicious file and each of the malicious codes. In the step of obtaining the representative attack code corresponding to the suspicious file based on the comparison result, one of an optimism criterion, a conservatism criterion, and a regret criterion is used to obtain the representative attack code corresponding to the suspicious file based on the comparison result.

The step of using the optimism criterion includes: retrieving the highest similarity probability from the aforesaid similarity probabilities and using the corresponding malicious code as the representative attack code. The step of using the conservatism criterion includes: retrieving the highest probability of minimum difference from the aforesaid probabilities of minimum difference and using the corresponding malicious code as the representative attack code. The step of using the regret criterion includes: retrieving the highest one from the aforesaid similarity probabilities as a first reference value and retrieving the highest one from the aforesaid probabilities of minimum difference as a second reference value; subtracting the first reference value by the aforesaid similarity probabilities respectively to obtain a plurality of adjusted similarity values; subtracting the second reference value by the aforesaid probabilities of minimum difference respectively to obtain a plurality of adjusted minimum difference values; comparing the adjusted similarity value and the adjusted minimum difference value corresponding to the suspicious file and each of the malicious codes to select the greater values as final comparison values; and retrieving the smallest one from the aforesaid plurality of final comparison values and using the corresponding malicious code as the representative attack code.

In one embodiment of the invention, after the behavior characteristic data corresponding to the suspicious file is received from the electronic apparatus via the data processing apparatus, in a hardware layer, a hardware operating behavior is identified; in an operating system layer, a system processing performance is identified; in a file layer, a signature of a malicious program is identified; and in an application layer, an execution behavior of an application program is identified.

The malicious code analysis method of the invention includes: obtaining a behavior characteristic data corresponding to a suspicious file by a processing unit; comparing the behavior characteristic data corresponding to the suspicious file with a malware characteristic data of each of a plurality of malicious codes by the processing unit to obtain a comparison result; based on the comparison result, obtaining a representative attack code corresponding to the suspicious file by the processing unit, wherein the representative attack code includes one or more of the malicious codes; and applying a precaution of the representative attack code by the processing unit.

The data processing apparatus of the invention includes: a communication unit, a storage unit, and a processing unit. The processing unit is coupled to the communication unit and the storage unit. The communication unit establishes connection with an electronic apparatus. The storage unit includes a malware library storing a malware characteristic data of each of a plurality of malicious codes. The processing unit receives a behavior characteristic data corresponding to a suspicious file from the electronic apparatus and compares the behavior characteristic data corresponding to the suspicious file with the malware characteristic data of each of the plurality of malicious codes to obtain a comparison result, and based on the comparison result, obtains a representative attack code corresponding to the suspicious file. And the processing unit transmits a precaution of the representative attack code to the electronic apparatus via the communication unit.

The malicious code analysis system of the invention includes an electronic apparatus and the aforesaid data processing apparatus. The data processing apparatus receives a behavior characteristic data corresponding to a suspicious file from the electronic apparatus to analyze the behavior characteristic data and thereby obtain a corresponding precaution.

The electronic apparatus of the invention includes: a storage unit and a processing unit. The processing unit is coupled to the storage unit. The storage unit includes a malware library, a monitor module, and an analysis module. The malware library stores a malware characteristic data of each of a plurality of malicious codes. The processing unit executes the monitor module and the analysis module. Here, when detecting a suspicious file through the monitor module, the processing unit executes the following actions through the analysis module, including: obtaining a behavior characteristic data corresponding to the suspicious file; comparing the behavior characteristic data corresponding to the suspicious file with the malware characteristic data of each of the malicious codes to obtain a comparison result; and based on the comparison result, obtaining a representative attack code corresponding to the suspicious file, wherein the representative attack code includes one or more of the malicious codes, and applying a precaution of the representative attack code.

In light of the above, the data processing apparatus is a center which has intelligence and can perform a malicious code analysis. When it is impossible to identify whether a detected suspicious file is a malicious program, a malicious code analysis is performed and a corresponding precaution is provided.

To provide a further understanding of the aforementioned and other features and advantages of the invention, exemplary embodiments, together with the reference drawings, are described in detail below.

DESCRIPTION OF THE EMBODIMENTS

Figure 1:
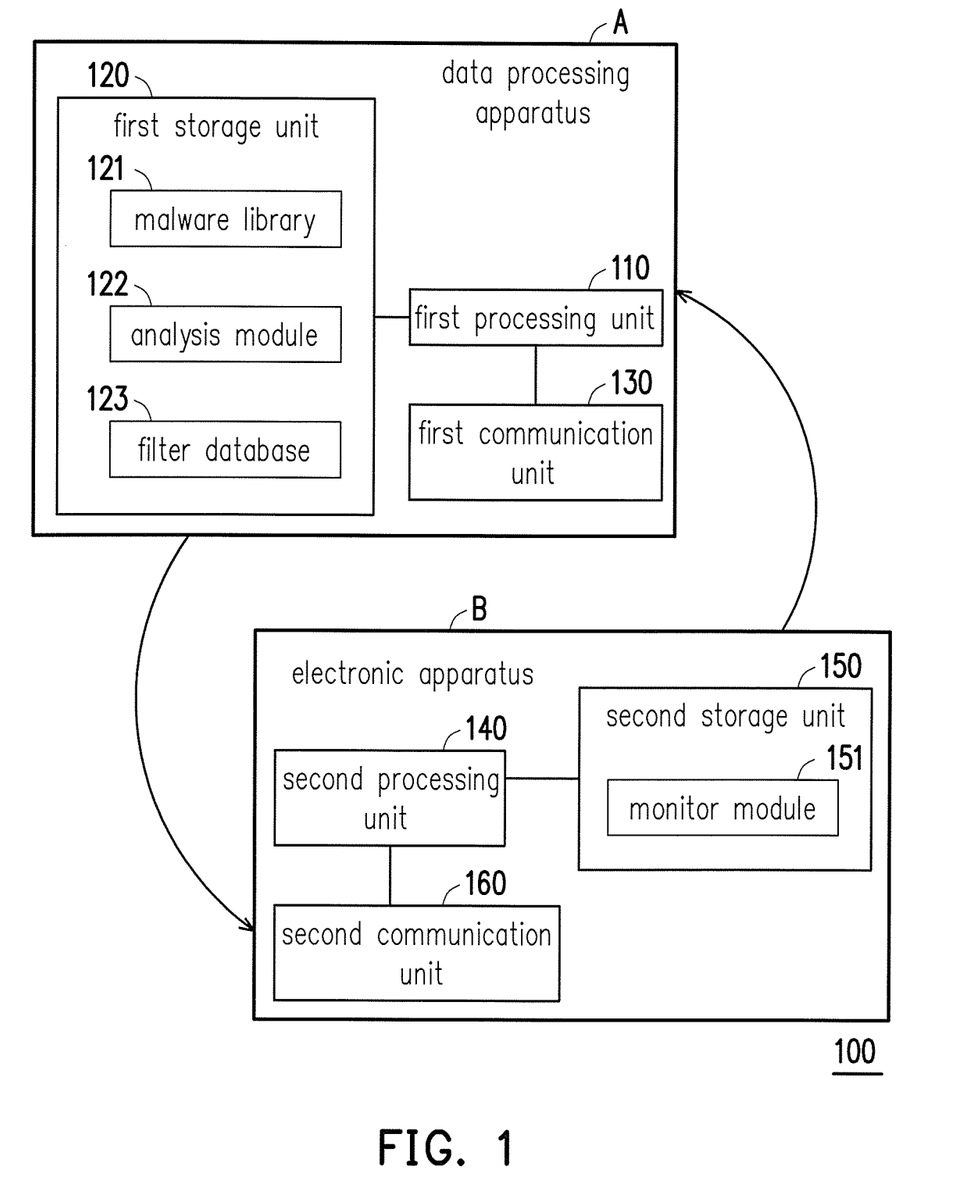
FIG. 1 is a block diagram of a malicious code analysis system according to one embodiment of the invention.

FIG. 1 is a block diagram of a malicious code analysis system according to one embodiment of the invention. A malicious code analysis system 100 includes a data processing apparatus A and an electronic apparatus B. The data processing apparatus A includes a first processing unit 110, a first storage unit 120, and a first communication unit 130. The first processing unit 110 is coupled to the first storage unit 120 and the first communication unit 130. The electronic apparatus B includes a second processing unit 140, a second storage unit 150, and a second communication unit 160. The second processing unit 140 is coupled to the second storage unit 150 and the second communication unit 160.

The first processing unit 110 and the second processing unit 140 are central processing units (CPU), programmable microprocessors, embedded control chips, digital signal processors (DSP), application specific integrated circuits (ASIC), or other similar devices, for example. The first storage unit 120 and the second storage unit 150 are non-volatile memories, random access memories (RAM), or hard disks, for example. The first communication unit 130 and the second communication unit 160 are chips supporting wired or wireless communication protocols, for example.

The data processing apparatus A is a data center which has intelligence and can perform a malicious code analysis, such as a server having high computational capacity. The data processing apparatus A receives feedback information from various parties and provides analyses and solutions for unknown malicious codes based on the received feedback information. When a transmission end (the electronic apparatus B, for example) detects a suspicious file but is unable to provide a corresponding precaution (namely, being unable to identify whether the suspicious file is a malicious program), the transmission end transmits an analysis request to the data processing apparatus A, and the data processing apparatus A in turn learns precautions relevant to the suspicious file, such as isolation and removal, through machine learning algorithms.

Here, the malicious codes include computer viruses, computer worms, Trojan horses, ransomware, spyware, adware, scareware, etc.

In the data processing apparatus A, the first storage unit 120 includes a malware library 121, an analysis module 122, and a filter database 123. The malware library 121 stores malware characteristic data of each of a plurality of known malicious codes. The first processing unit 110 executes the analysis module 122, and the analysis module 122 learns precautions corresponding to the suspicious file through machine learning algorithms. The analysis module 122 also generates precautions based on user-defined principles (e.g., object, content, and time) to ensure security of a computer. On the other hand, the precautions generated by the analysis module 122 are stored in the filter database 123.

Within a business, a security policy may be further set up according to the importance of the object. For example, user terminal devices of employees at the level of assistant vice presidents or above are further configured in the security policy such that even if a virus is detected, the working environment is not disturbed. For example, at working hours, actions such as "open", "close", and "execute" are still allowed. At non-working hours, infected files are determined to be isolated or removed according to the precautions. With respect to user terminal devices of employees below assistant vice presidents, infected files are determined to be isolated or removed according to the precautions at working hours.

The electronic apparatus B is an electronic apparatus having computational capacity such as a server, a personal computer, a laptop, a tablet computer, a smartphone, and a wearable device, for example. In the electronic apparatus B, the second storage unit 150 includes a monitor module 151. The monitor module 151 is antivirus software, for example. After the monitor module 151 is installed on the electronic apparatus B, the monitor module 151 monitors actions of the electronic apparatus B and further scans storage space of the electronic apparatus B for malicious codes such as computer viruses, computer worms, and Trojan horses.

When the monitor module 151 detects a suspicious file in the electronic apparatus B and cannot identify whether the suspicious file is a malicious program, a behavior characteristic data corresponding to the suspicious file is transmitted to the data processing apparatus A via the second communication unit 160 for the analysis module 122 to analyze. Examples are given below to respectively illustrate a monitor method of the electronic apparatus B and a malicious code analysis method of the data processing apparatus A.

Figure 2:
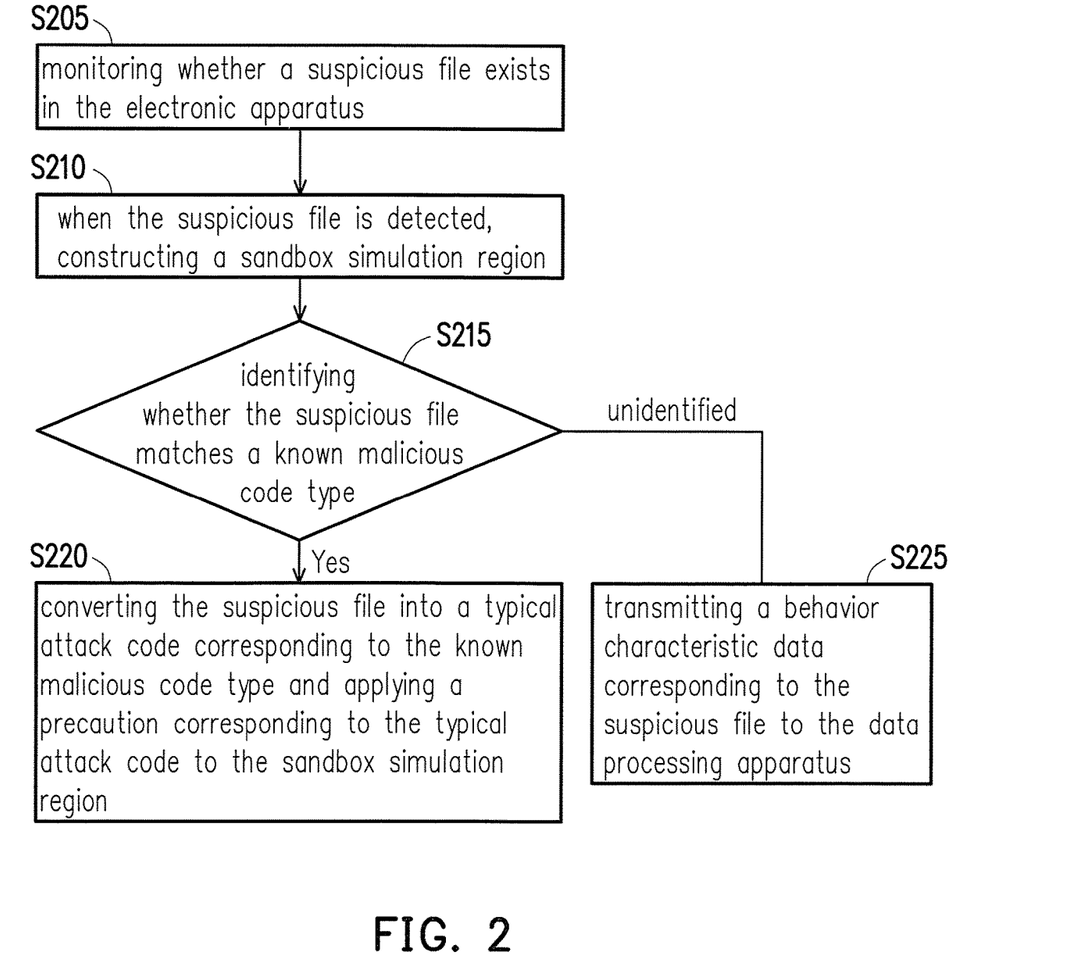
FIG. 2 is a flowchart of an electronic apparatus monitor method according to one embodiment of the invention.

FIG. 2 is a flowchart of an electronic apparatus monitor method according to one embodiment of the invention. Referring to FIGS. 1 and 2, in step S205, the monitor module 151 monitors whether a suspicious file exists in the electronic apparatus B. For example, a comparison is made with stored signatures or behavior data to determine whether an action currently executed by the second processing unit 140 is abnormal, thereby determining whether it is likely that a stored file or a currently executed program has been infected by a malicious code. For example, when an action such as "open", "close", or "execute" is performed on a file by any program, the monitor module 151 performs a detection on such action. For example, the monitor module 151 compares the aforesaid action with previously stored behavior data. Alternatively, the monitor module 151 compares the aforesaid file with previously stored virus signatures. Once the aforesaid action or the aforesaid file is identified as abnormal, the aforesaid program or the aforesaid file is determined to be a suspicious file.

Next, in step S210, when the suspicious file is detected, the monitor module 151 constructs a sandbox simulation region to monitor the suspicious file in the sandbox simulation region. The sandbox simulation region can be seen as an effectively isolated secure region. Changes made in the sandbox simulation region do not cause damage to an operating system. Therefore, when the monitor module 151 detects a suspicious file, the suspicious file is first moved to an environment of the sandbox simulation region. In the sandbox simulation region is a statically existing data or a dynamically executed process.

Afterwards, in step S215, the monitor module 151 identifies whether the suspicious file matches a known malicious code type recorded therein. In the monitor module 151, a plurality of known malicious code types and their corresponding precautions are recorded. When a suspicious file is detected, the monitor module 151 determines whether the suspicious file matches one of the known malicious code types. If it does, step S220 is executed. If the suspicious file is unidentifiable, step S225 is executed.

If a known malicious code type corresponding to the suspicious file is identified, in step S220, the monitor module 151 converts the suspicious file into a typical attack code corresponding to the known malicious code type and applies a precaution corresponding to the typical attack code to the sandbox simulation region. Here, the precaution is a security policy.

For example, when the suspicious file is determined to be a Trojan horse, the monitor module 151 converts the suspicious file into a typical Trojan horse and applies a precaution (such as removing or deleting the suspicious file) corresponding to the typical Trojan horse to the sandbox simulation region. If the file cannot be removed, infected network segments are promptly isolated to inhibit spreading of infection.

If a known malicious code type corresponding to the suspicious file is unidentifiable, in step S225, a behavior characteristic data corresponding to the suspicious file is transmitted to the data processing apparatus A via the second communication unit 160.

With respect to the suspicious file unidentifiable by the monitor module 151, the electronic apparatus B feeds the behavior characteristic data of the suspicious file to a data center (i.e., the data processing apparatus A) to learn a precaution against the suspicious file through machine learning algorithms. Here, the precaution is a security policy (also called "computer virus vaccine"). The data processing apparatus A provides a corresponding computer virus vaccine for the electronic apparatus B. The electronic apparatus B obtains an antibody (or called "rule") based on the computer virus vaccine and deploys the antibody to the sandbox simulation region to enhance filter efficiency of malicious codes.

Figure 3:
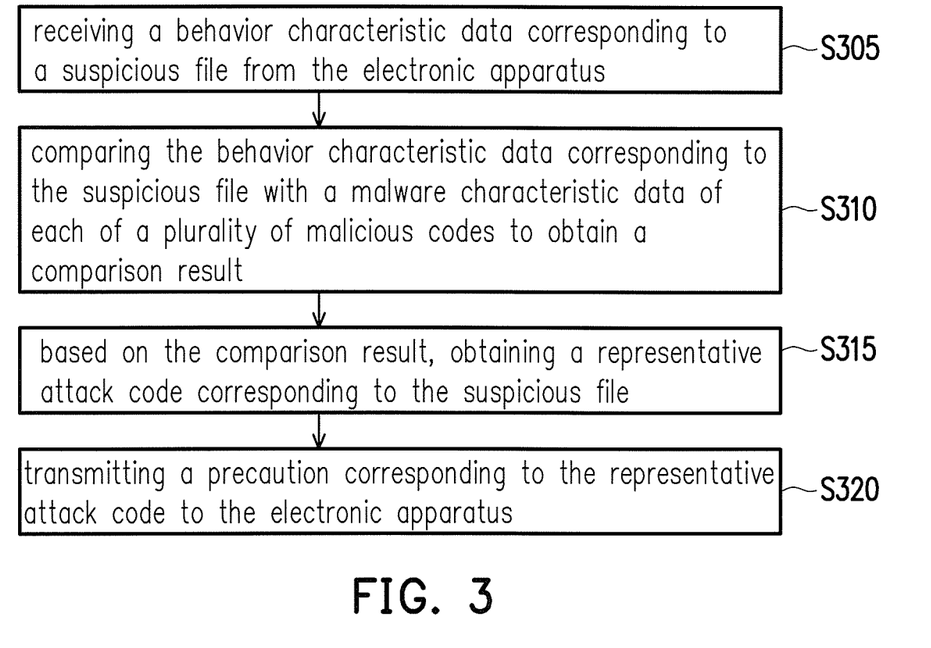
FIG. 3 is a flowchart of a malicious code analysis method according to one embodiment of the invention.

Examples are provided below to illustrate an analysis process of a malicious code performed through the data processing apparatus A. FIG. 3 is a flowchart of a malicious code analysis method according to one embodiment of the invention. Referring to FIGS. 1 and 3, in step S305, the data processing apparatus A receives a behavior characteristic data corresponding to a suspicious file from the electronic apparatus B. After the data processing apparatus A receives the behavior characteristic data corresponding to the suspicious file, the analysis module 122 analyzes the behavior characteristic data. Here, for clarity of illustration, the electronic apparatus B is used as an example. The data processing apparatus A may also receive a suspicious file from other platforms.

After the data processing apparatus A receives the behavior characteristic data corresponding to the suspicious file, indications relevant to the malicious attack are obtained through learning layer by layer. For example, in a hardware layer (first layer), how to identify a hardware operating behavior is learned. The hardware operating behavior includes hardware hangs, hardware restarts, abnormal fan speed, high power consumption, overly high motherboard temperature, etc. Next, in an operating system layer (second layer), how to identify a system processing performance is learned. The system processing performance includes lowered processing speed, a change in a file size, decreased system resource, opening of an unexpected port, unstable operation, a crash, etc. Afterwards, in a file layer (third layer), how to identify a signature of a malicious program is learned. Next, in an application layer (fourth layer), how to identify an execution behavior of an application program is learned. The execution behavior includes an attempt to access a link, self-reduplication, automatic deletion of a computer document, transmission or reception of data, network probes, and canceling certain processes. The four layers (the first layer through the fourth layer) of learning processes are for illustrative purposes only. The number of layers may be three, five, etc. and is not limited hereto.

In step S310, the behavior characteristic data corresponding to the suspicious file is compared with the malware characteristic data of each of the plurality of malicious codes through the analysis module 122 to obtain a comparison result. Next, in step S315, a representative attack code corresponding to the suspicious file is obtained based on the comparison result. Here, the representative attack code includes one or more of the malicious codes. For example, data mining, probability, or the information entropy theory is adopted to locate the representative attack code most similar to the suspicious file. The information entropy theory relates to measuring a degree of uncertainty of information based on a probability of occurrence of the information and thereby constructing an entropy model.

With respect to Shannon entropy, Shannon entropy is an expected value of a random variable I (amount of information) that reflects an average information amount of information transmitted. In other words, the more likely a piece of information occurs, the smaller an entropy value is. This means that when the occurrence of some information is more certain, the average information amount transmitted is less. In other words, the more regularly the information occurs, the smaller the uncertainty is. Specifically, an amount of information measured in an event is called the information amount. The information amount contained in an eventuality is determined by the probability at which the information occurs. The higher the probability of occurrence is, the less the contained information amount is. Conversely, the lower the probability of occurrence is, the more the contained information amount is.

Lastly, in step S320, the analysis module 122 transmits a precaution corresponding to the representative attack code to the electronic apparatus B via the first communication unit 130. After the representative attack code is obtained, the analysis module 122 may store the precaution corresponding to the representative attack code to the filter database 123 of the data processing apparatus A. Here, the precaution obtained includes identification information of the suspicious file and identification information of the representative attack code. After a designated period of time, the analysis module 122 reads the precaution from the filter database 123 and transmits the precaution to the electronic apparatus B. Here, the designated period of time is 0 second or more.

Through the above-described method, the data processing apparatus A provides a computer virus vaccine corresponding to a known malicious code type, transmits the computer virus vaccine to the electronic apparatus B, and deploys the same to the electronic apparatus B. Accordingly, the monitor module 151 of the electronic apparatus B defends against the suspicious file (namely, self-generating an antibody based on the computer virus vaccine) and applies the obtained antibody to a sandbox simulation region corresponding to the suspicious file.

Here, the malware library 121 maintained by the data processing apparatus A includes a plurality of vaccines (i.e., precautions). The electronic apparatus B and other platforms collect malware characteristic data of confirmed malicious codes and feeds these known malware characteristic data to the data processing apparatus A, such that the data processing apparatus A regularly or irregularly updates the signatures generated by these malware characteristic data to the monitor module 151 of the electronic apparatus B and other platforms.

The above-described steps S310 and S315 are further illustrated with the information entropy theory below. The analysis module 122 calculates a similarity probability between the suspicious file and each of the malicious codes through the information entropy theory. Here, the similarity probability is a degree of being most similar between the suspicious file and each of the malicious codes. For example, suppose that the malware library 121 includes known malicious codes "C01", "C02", and "C03". A precaution adopted against the malicious code "C01" is removal. A precaution adopted against the malicious code "C02" is isolation. Precautions adopted against the malicious code "C03" are removal and isolation. Similarity probabilities respectively between the suspicious file and the malicious codes "C01", "C02", and "C03" are calculated through the information entropy theory and are presented in Table 1 below.

TABLE 1

| | Similarity probability with suspicious file | Precaution |
|---|---|---|
| Malicious code "C01" | 80% | Removal |
| Malicious code "C02" | 60% | Isolation |
| Malicious code "C03" | 20% | Removal, isolation |

The analysis module 122 compares the aforesaid similarity probabilities with a threshold value to retrieve one or more of the malicious codes corresponding to the similarity probabilities higher than the threshold value to serve as the representative attack code. For example, if the threshold value is set at 70%, the precaution against the malicious code "C01" is adopted. If the threshold value is set at 50%, the precautions against both of the malicious codes "C01" and "C02" are adopted. In other words, the precautions against a plurality of malicious codes may be combined.

In addition to adopting the above-described threshold value approach, the concept of the decision tree may also be introduced. As one of the methods for constructing classification models, the decision tree is a model where a tree structure is generated from given data through classification. To classify an inputted data, each node in the decision tree represents a decision rule. Based on a variable, the decision rule determines whether the inputted data is greater than, equal to, or smaller than a specific value. Accordingly, each node classifies the inputted data into several classes. The decision tree is a commonly used method for simultaneously providing classification and prediction.

Through the decision tree, the analysis module 122 calculates criteria that may be adopted at probabilities of the various known malware characteristic data. In the present embodiment, three criteria are provided, namely, the optimism criterion, the conservatism criterion, and the regret criterion.

Specifically speaking, through the information entropy theory, the analysis module 122 calculates a similarity probability and a probability of minimum difference between the suspicious file and each of the malicious codes. Here, the similarity probability is a degree of being most similar between the suspicious file and each of the malicious codes, and the probability of minimum difference is a degree of being most dissimilar between the suspicious file and each of the malicious codes.

For example, suppose that the malware library 121 includes known malicious codes "C01", "C02", and "C03". Moreover, suppose that the behavior characteristic data of the suspicious file includes eight indications, the malicious code "C01" includes seven indications, and five indications of the malicious code "C01" are most similar to the behavior characteristic data of the suspicious file. Accordingly, similarity probabilities of these similar indications are calculated using an information amount formula of the information entropy theory. Suppose that one indication of the malicious code "C01" is least similar to the behavior characteristic data of the suspicious file. A probability of minimum difference of the aforesaid dissimilar indication is calculated using the information amount formula of the information entropy theory. Table 2 presents similarity probabilities and probabilities of minimum difference respectively between the suspicious file and the malicious codes "C01", "C02", and "C03".

TABLE 2

|  | Similarity probability with suspicious file | Probability of minimum difference with suspicious file |
| --- | --- | --- |
| Malicious code "C01" | 80% | 40% |
| Malicious code "C02" | 60% | 70% |
| Malicious code "C03" | 20% | 50% |

Next, through the decision tree, the analysis module 122 determines to adopt one of the optimism criterion, the conservatism criterion, and regret criterion and obtains a representative attack code corresponding to the suspicious file based on a comparison result.

The optimism criterion states: seeking maximum profit at the highest risk. In other words, the biggest profit is selected from each solution, and the biggest one is further selected among them. For example, regarding to the similarity probability and the probability of minimum difference, the biggest profit is the similarity probability. The analysis module 122 retrieves the highest similarity probability from the aforesaid similarity probabilities (namely, the most optimistic) and uses the corresponding malicious code as the representative attack code. In the example of Table 2, the malicious code "C01" (i.e. 80% is the highest among the similarity probabilities) is selected as the representative attack code and the precaution against the malicious code "C01" is adopted.

The conservatism criterion states: selecting one smallest profit from each solution and selecting the biggest one from these smallest profits. For example, regarding to the similarity probability and the probability of minimum difference, the smallest profit is the probability of minimum difference. The analysis module 122 retrieves the highest probability of minimum difference from the aforesaid probabilities of minimum difference (namely, the most conservative) and uses the corresponding malicious code as the representative attack code. In the example of Table 2, the malicious code "C02" (i.e. 70% is the highest among the probability of minimum differences) is selected as the representative attack code and the precaution against the malicious code "C02" is adopted.

The regret criterion states: comparing the greatest opportunity loss of each solution and selecting the smallest one among them. More specifically, the analysis module 122 retrieves the highest one from the aforesaid similarity probabilities as a first reference value and retrieves the highest one from the aforesaid probabilities of minimum difference as a second reference value. In other words, the similarity probability 80% of the malicious code "C01" is used as the first reference value and the probability of minimum difference 70% of the malicious code "C02" is used as the second reference value.

Next, the first reference value is subtracted by the aforesaid similarity probabilities respectively to obtain a plurality of adjusted similarity values and the second reference value is subtracted by the aforesaid probabilities of minimum difference respectively to obtain a plurality of adjusted minimum difference values, as presented in Table 3 below.

TABLE 3

|  | Adjusted similarity value | Adjusted minimum difference value | Higher value retrieved |
| --- | --- | --- | --- |
| Malicious code "C01" | \|80% − 80%\| = 0 | \|70% − 40%\| = 30% | 30% |
| Malicious code "C02" | \|80% − 60%\| = 20% | \|70% − 70%\| = 0 | 20% |
| Malicious code "C03" | \|80% − 20%\| = 60% | \|70% − 50%\| = 20% | 60% |

Afterwards, the adjusted similarity value and the adjusted minimum difference value of each of the malicious codes are compared, and the greater value is selected as the final comparison value. In other words, in terms of the malicious code "C01", with the adjusted similarity value being 0 and the adjusted minimum difference value being 30%, the greater value 30% is selected as the final comparison value. Similarly, the final comparison value of the malicious code "C02" is 20% and the final comparison value of the malicious code "C03" is 60%.

Lastly, the smallest one among the aforesaid final comparison values is retrieved and the corresponding malicious code is used as the representative attack code. Namely, the malicious code "C02" is used as the representative attack code and the precaution against the malicious code "C02" is adopted.

However, there are still other decision-making methods. The three criteria described above are merely for illustrative purposes. The methods further include the expected value, the Bayes' theorem, etc. and are not limited hereto.

Figure 4:
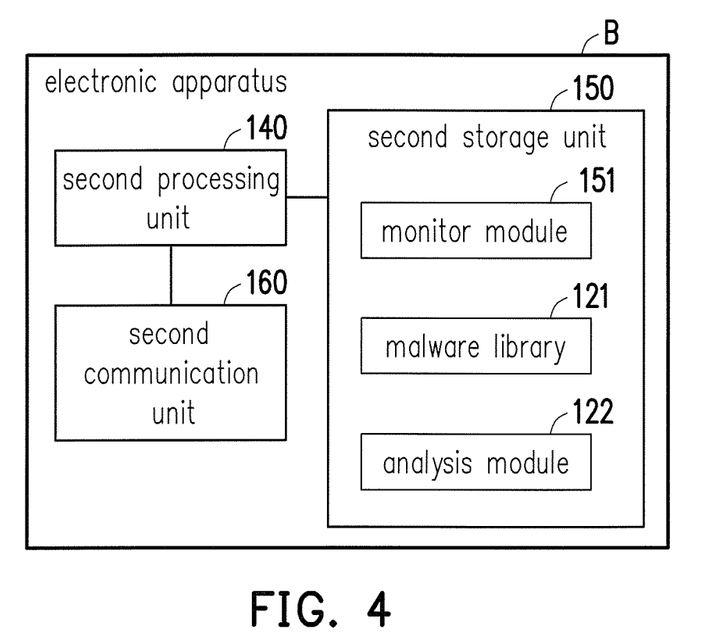
FIG. 4 is a block diagram of an electronic apparatus according to another embodiment of the invention.

In addition, in other embodiments, if the computational capacity of the electronic apparatus B is sufficient, the analysis of the malicious codes may be directly performed in the electronic apparatus B. For example, FIG. 4 is a block diagram of an electronic apparatus according to another embodiment of the invention. Referring to FIG. 4, an analysis module 122 is installed in an electronic apparatus B, and a malware library 121 is constructed in a second storage unit 150. When the second processing unit 140 detects a suspicious file in the electronic apparatus B through the monitor module 151 and the second processing unit 140 is unable to identify a known malicious code type corresponding to the suspicious file, the analysis module 122 installed in the electronic apparatus B obtains a behavior characteristic data corresponding to the suspicious file to thereby compare the behavior characteristic data corresponding to the suspicious file with a malware characteristic data of each of a plurality of malicious codes recorded in the malware library 121 of the electronic apparatus B and obtain a comparison result. Moreover, based on the comparison result, the second processing unit 140 obtains a representative attack code corresponding to the suspicious file (similar to steps S310 and S315). Lastly, the second processing unit 140 applies a precaution corresponding to the representative attack code.

In summary of the above, when it is impossible to identify whether a detected suspicious file is a malicious program, a malicious code similar to the suspicious file is learned through machine learning algorithms and a corresponding precaution, such as isolation or removal, is further taken. Accordingly, a corresponding precaution can first be executed against the unknown suspicious file, such that the suspicious file does not have the chance to spread and infect other files.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A malicious code analysis method comprising:
   receiving a behavior characteristic data corresponding to a suspicious file from an electronic apparatus via a data processing apparatus, the data processing apparatus executing following steps comprising:
   identifying a plurality of data in at least one hardware layer and at least one software layer through the behavior characteristic data, comprising:
   in the at least one hardware layer, identifying a hardware operating behavior;
   comparing the data with a malware characteristic data of each of a plurality of malicious codes to obtain a comparison result;
   based on the comparison result, obtaining a representative attack code corresponding to the suspicious file, wherein the representative attack code comprises one or more of the malicious codes; and
   transmitting a precaution of the representative attack code to the electronic apparatus,
   wherein the step of comparing the data with the malware characteristic data of each of the malicious codes to obtain the comparison result comprises:
   calculating a similarity probability and a probability of minimum difference between the suspicious file and each of the malicious codes by using an information entropy theory,
   wherein the similarity probability is a degree of being most similar between the suspicious file and each of the malicious codes and the probability of minimum difference is a degree of being most dissimilar between the suspicious file and each of the malicious codes,
   wherein the probability of minimum difference is calculated by using at least one indication of each of the malicious codes which is least similar to the behavior characteristic data of the suspicious file.

2. The malicious code analysis method according to claim 1, wherein before the behavior characteristic data corresponding to the suspicious file is received from the electronic apparatus via the data processing apparatus, the electronic apparatus executes following steps:
   monitoring whether the suspicious file exists in the electronic apparatus;
   when the suspicious file is detected, constructing a sandbox simulation region to monitor the suspicious file in the sandbox simulation region;
   identifying whether the suspicious file matches a known malicious code type recorded in the electronic apparatus;
   if the known malicious code type corresponding to the suspicious file is identified, converting the suspicious file into a typical attack code corresponding to the known malicious code type and applying a precaution of the typical attack code to the sandbox simulation region;
   and if the known malicious code type corresponding to the suspicious file is unidentifiable, transmitting the behavior characteristic data corresponding to the suspicious file to the data processing apparatus.

3. The malicious code analysis method according to claim 2, further comprising:
   after the precaution of the representative attack code is received by the electronic apparatus, converting the suspicious file into the typical attack code corresponding to the representative attack code and applying the precaution to the sandbox simulation region.

4. The malicious code analysis method according to claim 1, wherein after the step of obtaining the representative attack code corresponding to the suspicious file, further comprising:
   storing the precaution of the representative attack code to a filter database of the data processing apparatus;

and after a designated period of time, reading the precaution from the filter database and transmitting the precaution to the electronic apparatus.

5. The malicious code analysis method according to claim 1, wherein the step of comparing the data with the malware characteristic data of each of the malicious codes to obtain the comparison result comprises:
calculating the similarity probability between the suspicious file and each of the malicious codes by using the information entropy theory, wherein the similarity probability is the degree of being most similar between the suspicious file and each of the malicious codes.

6. The malicious code analysis method according to claim 5, wherein the step of obtaining the representative attack code corresponding to the suspicious file based on the comparison result comprises:
comparing the similarity probability corresponding to each of the malicious codes with a threshold value to retrieve one or more of the malicious codes corresponding to the similarity probability higher than the threshold value to serve as the representative attack code.

7. The malicious code analysis method according to claim 1, wherein the step of obtaining the representative attack code corresponding to the suspicious file based on the comparison result comprises:
using one of an optimism criterion, a conservatism criterion, and a regret criterion to obtain the representative attack code corresponding to the suspicious file based on the comparison result, wherein the step of using the optimism criterion comprises:
retrieving the highest similarity probability from the plurality of similarity probabilities and using the corresponding malicious code as the representative attack code;
the step of using the conservatism criterion comprises:
retrieving the highest probability of minimum difference from the plurality of probabilities of minimum difference and using the corresponding malicious code as the representative attack code;
the step of using the regret criterion comprises:
retrieving the highest one from the plurality of similarity probabilities as a first reference value and retrieving the highest one from the plurality of probabilities of minimum difference as a second reference value;
subtracting the first reference value by the plurality of similarity probabilities respectively to obtain a plurality of adjusted similarity values;
subtracting the second reference value by the plurality of probabilities of minimum difference respectively to obtain a plurality of adjusted minimum difference values;
comparing each of the adjusted similarity values and each of the adjusted minimum difference values corresponding to the suspicious file and each of the malicious codes to select the greater value as a final comparison value; and
retrieving the smallest one from the plurality of final comparison values and using the corresponding malicious code as the representative attack code.

8. The malicious code analysis method according to claim 1, wherein the at least one software layer includes an operating system layer, a file layer and an application layer, and after the step of receiving the behavior characteristic data corresponding to the suspicious file from the electronic apparatus via the data processing apparatus, further comprising:

in the operating system layer, identifying a system processing performance;
in the file layer, identifying a signature of a malicious program; and
in the application layer, identifying an execution behavior of an application program.

9. A malicious code analysis system comprising:
an electronic apparatus; and a data processing apparatus comprising:
a first communication chip establishing connection with the electronic apparatus;
a first hardware storage comprising a malware library storing a malware characteristic data of each of a plurality of malicious codes; and
a first processor coupled to the first communication chip and the first hardware storage and receiving a behavior characteristic data corresponding to a suspicious file from the electronic apparatus, wherein the first processor identifies a plurality of data in at least one hardware layer and at least one software layer through the behavior characteristic data, the first processor identifies a hardware operating behavior in the at least one hardware layer, compares the data with the malware characteristic data of each of the malicious codes to obtain a comparison result, and based on the comparison result, obtains a representative attack code corresponding to the suspicious file, wherein the representative attack code comprises one or more of the malicious codes; and the first processor transmits a precaution of the representative attack code to the electronic apparatus via the first communication chip,
wherein the first processor calculates a similarity probability and a probability of minimum difference between the suspicious file and each of the malicious codes by using an information entropy theory to obtain the comparison result,
wherein the similarity probability is a degree of being most similar between the suspicious file and each of the malicious codes and the probability of minimum difference is a degree of being most dissimilar between the suspicious file and each of the malicious codes,
wherein the probability of minimum difference is calculated by using at least one indication of each of the malicious codes which is least similar to the behavior characteristic data of the suspicious file.

10. The malicious code analysis system according to claim 9, wherein the electronic apparatus comprises:
a second communication chip establishing connection with the first communication chip of the data processing apparatus;
a second hardware storage comprising a plurality of programming code segments;
a second processor coupled to the second communication chip and the second hardware storage, wherein the second processor drives the programming code segments to monitor whether the suspicious file exists in the electronic apparatus,
wherein when the suspicious file is detected, the second processor constructs a sandbox simulation region to monitor the suspicious file in the sandbox simulation region; and the second processor identifies whether the suspicious file matches a known malicious code type recorded therein;
if the known malicious code type corresponding to the suspicious file is identified, the second processor converts the suspicious file into a typical attack code corresponding to the known malicious code type and applies a precaution of the typical attack code to the sandbox simulation region; and if the known malicious code type corresponding to the suspicious file is unidentifiable, the behavior characteristic data corresponding to the suspicious file is transmitted to the data processing apparatus via the second communication chip.

11. The malicious code analysis system according to claim 10, wherein after the precaution of the representative attack code is received by the electronic apparatus, the second processor converts the suspicious file into the typical attack code corresponding to the representative attack code and applies the precaution to the sandbox simulation region.

12. The malicious code analysis system according to claim 9, wherein the first hardware storage comprises:
a filter database storing the precaution of the representative attack code,
wherein after a designated period of time, the first processor reads the precaution from the filter database and transmits the precaution to the electronic apparatus.

13. The malicious code analysis system according to claim 9, wherein the first processor calculates the similarity probability between the suspicious file and each of the malicious codes by using the information entropy theory, wherein the similarity probability is the degree of being most similar between the suspicious file and each of the malicious codes.

14. The malicious code analysis system according to claim 13, wherein the first processor compares the similarity probability corresponding to each of the malicious codes with a threshold value to retrieve one or more of the malicious codes corresponding to the similarity probability higher than the threshold value to serve as the representative attack code.

15. The malicious code analysis system according to claim 9, wherein the first processor uses one of an optimism criterion, a conservatism criterion, and a regret criterion to obtain the representative attack code corresponding to the suspicious file based on the comparison result,
wherein based on the optimism criterion, the first processor retrieves the highest similarity probability from the plurality of similarity probabilities and uses the corresponding malicious code as the representative attack code;
based on the conservatism criterion, the first processor retrieves the highest probability of minimum difference from the plurality of probabilities of minimum difference and uses the corresponding malicious code as the representative attack code; and
based on the regret criterion, the first processor retrieves the highest one from the plurality of similarity probabilities as a first reference value and retrieves the highest one from the plurality of probabilities of minimum difference as a second reference value; the first reference value is subtracted by the plurality of similarity probabilities respectively to obtain a plurality of adjusted similarity values; the second reference value is subtracted by the plurality of probabilities of minimum difference respectively to obtain a plurality of adjusted minimum difference values; each of the adjusted similarity values and each of the adjusted minimum difference values corresponding to the suspicious file and each of the malicious codes are compared to select the greater value as a final comparison value; and the smallest one is retrieved from the plurality of final comparison values and the corresponding malicious code is used as the representative attack code.

16. The malicious code analysis system according to claim 9, wherein the at least one software layer includes an operating system layer, a file layer and an application layer, and after receiving the behavior characteristic data corresponding to the suspicious file, the first processor identifies a system processing performance in the operating system layer, identifies a signature of a malicious program in the file layer, and identifies an execution behavior of an application program in the application layer.

17. A data processing apparatus comprising:
a communication chip establishing connection with an electronic apparatus; a hardware storage comprising a malware library storing a malware characteristic data of each of a plurality of malicious codes; and
a processor coupled to the communication chip and the hardware storage and receiving a behavior characteristic data corresponding to a suspicious file from the electronic apparatus, wherein the processor identifies a plurality of data in at least one hardware layer and at least one software layer through the behavior characteristic data, the processor identifies a hardware operating behavior in the at least one hardware layer, and compares the data with the malware characteristic data of each of the malicious codes to obtain a comparison result, and based on the comparison result, obtains a representative attack code corresponding to the suspicious file, wherein the representative attack code comprises one or more of the malicious codes; and the processor transmits a precaution of the representative attack code to the electronic apparatus via the communication chip,
wherein the processor calculates a similarity probability and a probability of minimum difference between the suspicious file and each of the malicious codes by using an information entropy theory to obtain the comparison result,
wherein the similarity probability is a degree of being most similar between the suspicious file and each of the malicious codes and the probability of minimum difference is a degree of being most dissimilar between the suspicious file and each of the malicious codes,
wherein the probability of minimum difference is calculated by using at least one indication of each of the malicious codes which is least similar to the behavior characteristic data of the suspicious file.

18. A malicious code analysis method comprising:
obtaining a behavior characteristic data corresponding to a suspicious file by a processor;
identifying a plurality of data in at least one hardware layer and at least one software layer through the behavior characteristic data, comprising
in the at least one hardware layer, identifying a hardware operating behavior;
comparing the data with a malware characteristic data of each of a plurality of malicious codes by the processor to obtain a comparison result;
based on the comparison result, obtaining a representative attack code corresponding to the suspicious file by the processor, wherein the representative attack code comprises one or more of the malicious codes; and
applying a precaution of the representative attack code by the processor,
wherein the step of comparing the data with the malware characteristic data of each of the malicious codes to obtain the comparison result comprises:

calculating a similarity probability and a probability of minimum difference between the suspicious file and each of the malicious codes by using an information entropy theory, wherein the similarity probability is a degree of being most similar between the suspicious file and each of the malicious codes and the probability of minimum difference is a degree of being most dissimilar between the suspicious file and each of the malicious codes, wherein the probability of minimum difference is calculated by using at least one indication of each of the malicious codes which is least similar to the behavior characteristic data of the suspicious file.

19. An electronic apparatus comprising:

a hardware storage comprising a malware library and a plurality of programming code segments, wherein the malware library stores a malware characteristic data of each of a plurality of malicious codes; and a processor coupled to the hardware storage to execute the programming code segments, wherein when the processor detects a suspicious file, the processor executes following actions through the programming code segments, comprising:

obtaining a behavior characteristic data corresponding to the suspicious file;

identifying a plurality of data in at least one hardware layer and at least one software layer through the behavior characteristic data, comprising:

in the at least one hardware layer, identifying a hardware operating behavior;

comparing the data with the malware characteristic data of each of the malicious codes to obtain a comparison result; and based on the comparison result, obtaining a representative attack code corresponding to the suspicious file, wherein the representative attack code comprises one or more of the malicious codes, and applying a precaution of the representative attack code, wherein the processor calculates a similarity probability and a probability of minimum difference between the suspicious file and each of the malicious codes by using an information entropy theory to obtain the comparison result, wherein the similarity probability is a degree of being most similar between the suspicious file and each of the malicious codes and the probability of minimum difference is a degree of being most dissimilar between the suspicious file and each of the malicious codes, wherein the probability of minimum difference is calculated by using at least one indication of each of the malicious codes which is least similar to the behavior characteristic data of the suspicious file.

\* \* \* \* \*